United States Patent Office 2,950,391
Patented Aug. 23, 1960

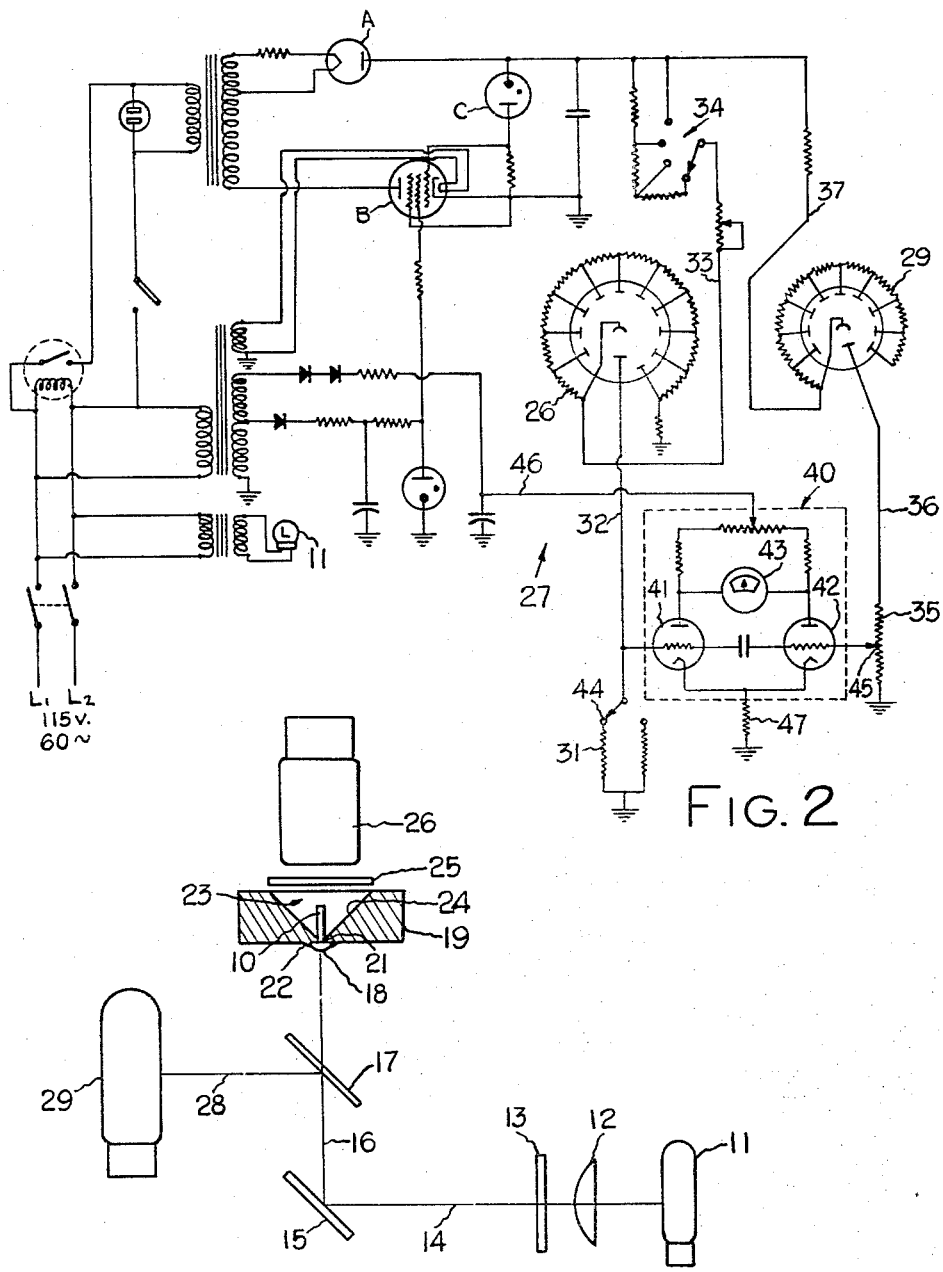
INVENTORS
CORWIN H. BRUMLEY
ROBERT J. MELTZER

2,950,391
FLUOROMETER

Corwin H. Brumley, Penfield, and Robert J. Meltzer, Irondequoit, N.Y., assignors to Bausch & Lomb Optical Company, Rochester, N.Y., a corporation of New York Filed June 26, 1957, Ser. No. 668,109

6 Claims. (Cl. 250—71.5)

This invention relates to means for detecting and measuring the intensity of fluorescence such as is emitted by certain objects when they are excited by ultraviolet light.

Such instruments known as fluorometers or fluorophotometers are commonly used for measuring the amount of fluorescence emitted by test objects under various analytical procedures. Such an instrument may also be used to determine quantitatively the dosage of gamma or X-rays to which a body has been exposed. Under one method, the test object used is made of a glass like material including silver phosphate so that after exposure to the X-rays the test object is subjected to ultraviolet light which excites the object to produce fluorescence which is then measured with a fluorometer. The amount of fluorescence produced is an indication of the amount or dosage of X-rays which has been directed onto the body carrying the test object. In one practice, the test object is in the form of a small glass rod, about 1 mm. in diameter and 6 mm. long, so that it can be inserted into the body which is to undergo X-ray irradiation. With the prior art instruments, it has been difficult to obtain an accurate measurement of the amount of fluorescence produced by such a small test object as has just been described.

One of the objects of this invention is to provide a fluorometer which will be simple in construction and efficient in operation. A further object is to provide a fluorometer having improved means for gathering the fluorescent light, which is emitted by the object under test, and directing it onto light sensitive means. Another object is to provide such an instrument which is capable of being used efficiently to measure the fluorescent light emitted by a relatively small test object. Still another object is to provide a fluorometer having reflecting means so constructed and arranged that a maximum amount of the light emitted by a fluorescing test object will be gathered and directed onto light sensitive means.

These and other objects and advantages reside in certain novel features of construction, arrangement and combination of parts as will hereinafter be more fully described and pointed out in the appended claims.

Referring to the drawings:

Fig. 1 is a schematic view of a preferred form of our invention with parts shown in section, and Fig. 2 is an electrical diagram showing a preferred circuit arrangement for operating the parts of the invention shown in Fig. 1.

With reference to Fig. 1 of the drawing, a small test object is designated by the numeral 10 and it is shown in position to be tested for its radiophotoluminescence as revealed by its fluorescibility after having been irradiated elsewhere by high frequency radiations as heretofore explained.

A suitable source 11 of ultraviolet radiation is provided to excite said object 10 to a fluorescent state, said radiation being projected by a suitable lens or lens system 12 through an optically aligned filter 13 which passes only those wavelengths in the neighborhood of $\lambda = 3650A$. After passing the filter 13, said rays are projected along the axis 14 to a totally reflecting mirror 15 which deviates the rays along an optical axis 16 and through a partially reflecting mirror or beam splitter 17 onto a collecting lens 18. By means of a lens 18, said ultraviolet rays are focused so as to enter the test object 10 through an optical surface formed on the bottom end thereof.

According to one preferred form of this invention, the test object 10 is held in a support member 19 having a central opening 21 wherein said object is erectly held in contact with the lens 18. Said lens is preferably fixed to the underside of the supporting member 19 by suitable means such as by spinning over a retainer lip 22 of the member around the periphery of the lens or otherwise as desired.

A recess 23, having a reflecting surface or wall 24 preferably of conical shape, is formed in the upper side of said supporting member 19 concentrically with the opening 21. The wall of the opening 21 has an axial extent only sufficient to hold the object 10 upright whereby the greatest practical area of radiating surface of the object is exposed to the conical surface 24. The most important feature of this invention is the provision of a hollow reflecting surface 24 surrounding as far as practical the object to be fluoresced and so shaped that a maximum of the emitted fluorsecence may be captured and directed onto an indicating device. Although the reflecting wall 24 is shown and described as being conical, it is obvious that other shapes of reflective surfaces may be used with good effect such as an inverted pyramid having a plurality of flat sides. The reflecting surface converges to a point where the test object is located so that a maximum amount of light emitted by the object may be gathered by the surface and directed onto the photoreceptor. The recess 23 may even be made in the form of a solid glass inverted cone which is reflectively coated on its inclined face and is provided with a hole at the apex for holding the test object 10.

Across the upper rim or base of the conical surface 24 or recess 23 is horizontally mounted in any preferred manner a filter 25 which selectively passes only those light waves in the visible region of the spectrum that are due to fluorescence of said object 10, the ultraviolet radiation being substantially all absorbed by the filter. A light sensitive device such as a photoreceptor 26 of the "end-on" type is mounted in any preferred manner closely over the upper surface of the filter 25 to receive the fluorescent rays that are transmitted through the filter and the photoelectric response of the photoreceptor may be used to actuate suitable electrical apparatus as shown in Fig. 2 whereby a quantitative reading of the fluorescent emittance of said test object 10 is provided. The light receiving area of the photoreceptor is substantially coextensive with the base of the conical surface 24 so that of the light gathered by the reflector will be directed onto the fluorometer.

Means are provided for reading the true fluorescent emittance of said test object and for compensating said reading for variations in the quantity of said light flux caused by small variations in the voltage which is impressed on the ultraviolet ray lamp 11. Such means may be provided in any desired form such as the electrical apparatus shown in Fig. 2 and designated generally by the numeral 27 whereby the ratio of fluorescent light emitted by the test object 10 to the ultraviolet light received by said object is obtained. Referring first to Fig. 1, the mirror 17 is suitably constructed so as to divide the radiation from the lamp 11 and direct a weak beam of ultraviolet rays along a lateral axis 28 so as to fall upon a second photoreceptor 29.

With regard to Fig. 2, the photoreceptors 26 and 29 are energized from the same power supply comprising the electron tubes A, B and C and the associated circuitry so that small changes in the supply voltage will affect each photoreceptor similarly. The aforesaid electrical apparatus further comprises a resistor 31 which is connected by a lead 32 to the photoreceptor 26 which is connected through a lead 33 and stepped resistor 34 to said power supply. A parallel circuit comprises the variable resistor 35, lead 36 and photoreceptor 29 which is connected by the lead 37 to said power supply.

A differential amplifier 40 comprising the electron tubes 41 and 42 and associated circuitry is provided to actuate a meter 43, connected between a pair of parallel amplifier circuits which contain said tubes, so as to indicate the voltage difference between a point 44 on the resistor 31 and a sliding tap 45 on the variable resistor 35 between which the amplifier 40 is connected. Said amplifier 40 is fed D.-C. current from a suitable power source through a lead 46, the amplifier being grounded at 47.

In operation, the emitted fluorescent light from the object 10 falls on the photoreceptor 26 and simultaneously ultraviolet light from the lamp 11 falls on the photoreceptor 29 causing signal currents to flow in the aforesaid parallel circuits which include the resistors 31 and 35, the relative strength of their currents being proportional to the light values received at their respective photoreceptors. With the differential amplifier 40 energized, the voltage difference between point 44 and resistor tap 45 in the associated circuitry is indicated on the meter 43. The resistor 35 is preferably a sliding wire type of resistor having a scale, not shown, which is calibrated to read different amounts of unbalance between point 44 and tap 45 so that said tap 45 may be adjusted to bring the meter reading and consequently the voltage difference between these points 44 and 45 back to zero before taking a reading on said scale. Such a reading gives the measure of the fluorescibility of the object 10 for any given condition of radiophotoluminescence.

As aforesaid, this invention may be constructed in several forms to meet specific needs in the testing procedure and to accommodate different shapes of the test objects used, the form shown and described being merely one of the successful forms of this device.

We claim:

1. A fluorometer for measuring the fluorescence of an elongated test object comprising means for supporting the object at one end thereof, means for directing ultraviolet radiations onto said one end of the object to produce fluorescence, a light sensitive device positioned opposite to and in alignment with an opposite part of the object, and means for directing the fluorescence from said object onto said device comprising hollow reflecting surface means extending around the object, said surface means converging towards said one end of the object whereby fluorescence emitted from the object will be directed by the surface means onto the light sensitive device.

2. In an apparatus for measuring the quantity of fluorescent light flux emitted by an elongated test object, the combination of means provided with converging light reflecting surface means having a central portion through which radiant energy may be transmitted, means disposed at said portion for holding said object at one end thereof and in position to be irradiated by said energy, means including a source of radiant energy optically aligned with said central portion for directing said energy into the test object through said one end for fluorescing said object, a fluorescence-responsive photoreceptor located above said surface means in a position to receive rays reflected therefrom, and electrical means operatively connected to indicate the instantaneous ratio between the emittance of said source and the quantity of fluorescent light emitted by said photoreceptor during irradiation of said object.

3. In an apparatus for measuring the light flux emitted by an elongated test object, the combination of a support member having means operably constructed thereon for holding said object at one end thereof and in a position to receive ultraviolet radiation, a reflecting surface formed around said object on said member and angularly disposed to said object so as to direct light flux emitted thereby in one general direction, a source of ultraviolet radiation which is optically aligned to irradiate said object, a first photoreceptor optically aligned to receive the fluorescent light which is emitted by said object and reflected from said surface, a fluorescence band pass filter located between said surface and photoreceptor, a second photoreceptor optically aligned to receive a portion of the radiation from said source, and electrical means operatively connected to the first and second photoreceptors to measure the ratio of emittance of fluorescent light from said object to the fluorescence-exciting energy received by said object whereby the true quantity of emitted fluorescent light is determined.

4. In a fluorometer the combination with means for directing ultraviolet radiation onto an elongated test object to produce fluorescence and means for measuring the quantity of fluorescence including a fluorescent-responsive photoreceptor, of a member having a hollow, substantially continuous reflecting surface converging to an opening therein, means for holding one end of the test object in said opening with the object extending into the space defined by the reflecting surface whereby said end of the object near said opening may receive ultraviolet radiation to produce fluorescence which will be emitted from the entire side surface of the object and be directed by the reflecting surface onto the photoreceptor.

5. An apparatus for measuring the quantity of fluorescent light flux emitted by an elongated test object comprising recessed tapered reflecting means having an opening at the apex portion, means for holding one end of the test object at said opening with the test object extending into the space defined by the reflecting means whereby the elongated side surface of the object is adjacent the reflecting means, a source of fluorescence-exciting radiations optically aligned with said object through said opening for producing fluorescence, a fluorescence-responsive photoreceptor facing said reflecting means to receive the radiation reflected by said reflecting means and means operatively connected to said photoreceptor for indicating the quantity of said fluorescent light.

6. In a fluorometer the combination with means for directing ultraviolet radiation onto an elongated test object to produce fluorescence and means for measuring the quantity of fluorescence including a fluorescent-responsive photoreceptor, a hollow reflecting surface means tapering to an opening, means for holding one end of the test object in said opening with the object extending into the space defined by the reflecting surface means, and a source of fluorescence-responsive radiation optically aligned with said one end of the object through said opening for producing fluorescence which will be emitted from substantially the entire side surface of the object and be directed onto the photoreceptor.

References Cited in the file of this patent

UNITED STATES PATENTS

| | | |
|---|---|---|
| 2,549,574 | Condiff | Apr. 17, 1951 |
| 2,551,542 | March | May 1, 1951 |
| 2,593,391 | Bray | Apr. 15, 1952 |
| 2,710,924 | Morrison | June 14, 1955 |
| 2,730,625 | Shurcliff | Jan. 10, 1956 |
| 2,829,264 | Garrison | Apr. 1, 1958 |
| 2,855,520 | Stoddard et al. | Oct. 7, 1958 |

UNITED STATES PATENT OFFICE

CERTIFICATE OF CORRECTION

Patent No. 2,950,391            August 23, 1960

Corwin H. Brumley et al.

It is hereby certified that error appears in the printed specification of the above numbered patent requiring correction and that the said Letters Patent should read as corrected below.

Column 2, line 58, after "that" insert -- all --.

Signed and sealed this 4th day of April 1961.

(SEAL)
Attest: ERNEST W. SWIDER

Attesting Officer

ARTHUR W. CROCKER
Acting Commissioner of Patents